(12) United States Patent
Naumann et al.

(10) Patent No.: US 9,506,767 B2
(45) Date of Patent: Nov. 29, 2016

(54) METHOD AND DEVICE FOR OPERATING A MOTOR VEHICLE BY SPECIFYING A SETPOINT SPEED

(71) Applicant: Robert Bosch GmbH, Stuttgart (DE)

(72) Inventors: Marc Naumann, Sunnyvale, CA (US); Jens Ritzert, Gerlingen (DE); Tobias Radke, Stuttgart (DE); Guenther Emanuel, Schmelz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/854,907

(22) Filed: Sep. 15, 2015

(65) Prior Publication Data

US 2016/0082947 A1  Mar. 24, 2016

(30) Foreign Application Priority Data

Sep. 19, 2014 (DE) ........................ 10 2014 218 928
Feb. 9, 2015 (DE) ........................ 10 2015 202 216

(51) Int. Cl.
*G01C 21/34* (2006.01)
*B60W 20/00* (2016.01)
*G05D 1/02* (2006.01)

(52) U.S. Cl.
CPC ........ *G01C 21/3469* (2013.01); *B60W 20/102* (2013.01); *B60W 20/104* (2013.01); *B60W 20/108* (2013.01); *G05D 1/0217* (2013.01); *B60W 2550/14* (2013.01); *B60W 2720/10* (2013.01); *G05D 2201/0213* (2013.01)

(58) Field of Classification Search
CPC .......... G01C 21/3469; B60W 20/104; B60W 20/102; B60W 20/108; B60W 2550/14; B60W 2720/10; G05D 1/0217; G05D 2201/0213
USPC .......................................................... 701/22
See application file for complete search history.

(56) References Cited

U.S. PATENT DOCUMENTS

| | | | |
|---|---|---|---|
| 2010/0076632 A1* | 3/2010 | Hehle | B63H 21/22 701/21 |
| 2010/0256852 A1* | 10/2010 | Mudalige | G08G 1/22 701/24 |
| 2014/0103888 A1* | 4/2014 | Divan | G05F 3/02 323/208 |
| 2014/0244130 A1* | 8/2014 | Filev | B60K 31/00 701/96 |
| 2015/0284010 A1* | 10/2015 | Beardsley | B60W 50/10 701/41 |
| 2015/0345621 A1* | 12/2015 | Sujan | F16H 61/0213 701/58 |
| 2016/0016586 A1* | 1/2016 | Banerjee | B60W 50/0097 701/94 |
| 2016/0054735 A1* | 2/2016 | Switkes | G08G 1/22 701/23 |
| 2016/0059412 A1* | 3/2016 | Oleynik | B25J 9/163 700/257 |

FOREIGN PATENT DOCUMENTS

WO    2013/087536 A1    6/2013

* cited by examiner

*Primary Examiner* — McDieunel Marc
*Assistant Examiner* — James E Stroud
(74) *Attorney, Agent, or Firm* — Norton Rose Fulbright US LLP; Gerard Messina

(57) ABSTRACT

A method for operating a motor vehicle includes providing route segments of a route ahead of the vehicle that is most likely to be traveled as well as route parameters associated with the route segments, dividing the route ahead of the vehicle that is most likely to be traveled into sub-segments, optimizing the setpoint speeds at the segment boundaries of the sub-segments with respect to a specified target function, interpolating the setpoint speeds obtained at the positions of the segment boundaries to obtain a characteristic curve of the setpoint speed, and operating the motor vehicle based on a specification of the characteristic curve of the setpoint speed.

17 Claims, 2 Drawing Sheets

METHOD AND DEVICE FOR OPERATING A MOTOR VEHICLE BY SPECIFYING A SETPOINT SPEED

FIELD OF THE INVENTION

The present invention relates to motor vehicles, in particular, to a method for optimizing a specification of a setpoint speed according to an optimization goal such as, e.g., a minimization of a fuel consumption.

BACKGROUND

Today's driver assistance systems for motor vehicles include, among other things, a speed control that makes it possible to specify the characteristic curve of a setpoint speed by taking into account a route ahead of the vehicle, by which a fuel consumption for driving the route may be lowered. In hybrid drive systems, there is furthermore a degree of freedom in ascertaining the load distribution that specifies a distribution of the drive output to be provided by the different drive units. This results in an extensive optimization problem, which, due to the limited computing capacity in a motor vehicle, can so far not be solved optimally within a satisfactory time period.

The document WO 2013/087536 A1 discloses a method for managing an energy consumption of a motor vehicle, in which a route is divided into segments, to which respectively a speed is assigned, at which the motor vehicle is to travel through the respective segment. A probability is assigned to the speed transitions between two respective segments.

An energy consumption model is applied to the probabilities between the segments in order to perform an optimization.

SUMMARY

Example embodiments of the present invention provide a method, device, and motor vehicle for specifying a setpoint speed to operate a motor vehicle.

According to an example embodiment of the present invention, a method for operating a motor vehicle includes: providing route segments of a route ahead of the vehicle that is most likely to be traveled as well as route parameters associated with the route segments; dividing the route ahead of the vehicle that is most likely to be traveled into sub-segments; performing an optimization of the setpoint speeds at the segment boundaries of the sub-segments with respect to a specified target function; interpolating the setpoint speeds obtained at the positions of the segment boundaries in order to obtain a characteristic curve of the setpoint speed; and operating the motor vehicle based on a specification of the characteristic curve of the setpoint speed.

In an example embodiment, the optimization problem for optimizing the characteristic curve of the setpoint speed over a route ahead of the vehicle is reformulated as a reduced optimization problem with a good solution quality being achievable in a short computing time. For this purpose, a route likely to be traveled is divided into sub-segments and the characteristic curve of the setpoint speed over the route is optimized in accordance with the target function only at the positions of the segment boundaries between the sub-segments of the route.

The speed planning, i.e., the adaptation or variation of the setpoint speeds at the segment boundaries, is taken over by metaheuristics that ensure a good compromise between exploration and exploitation of the search domain.

This makes it possible to optimize the characteristic curve of the setpoint speed of a motor vehicle over a route ahead of the vehicle within specified speed limits in accordance with a target function, which defines in particular a specification regarding a fuel consumption.

This procedure in particular also allows for the combination of an optimization with a load distribution (torque distribution) in a hybrid drive system.

The above method in particular reformulates the difficult optimization problem for the energy-use-optimized/fuel-use-optimized specification of the setpoint speed on a given route ahead of the vehicle as a reduced optimization problem. In the process, the setpoint speed specification is optimized only for the segment boundaries, into which the route was divided, and, in-between, a transition is approximated between the setpoint speeds ascertained by the optimization at the segment boundaries by interpolation. In hybrid drive systems, a corresponding determination or optimization of the load distribution can be performed simultaneously or subsequently.

Furthermore, the route most likely to be traveled can be determined from navigation data input by a driver or from empirical values, based on already traveled routes.

In an example embodiment, the information about the route segments resulting from the most probable route contains consumption-related route parameters, which include in particular information about a route incline or decline, about a road surface property or type, and/or about one or more speed limits.

In an example embodiment, the route is divided into sub-segments, which join at segment boundaries, the segment boundaries being (a) equidistantly distributed, (b) provided at positions of the route at which a gradient of a specified upper and/or lower speed limit changes, and/or (c) provided at positions of the route at which a gradient of an upper and/or lower energy limit changes, the upper and lower energy limit respectively resulting as the sum of the potential energy of the motor vehicle at the position of the route and the kinetic energy at a speed that corresponds to the upper and lower speed limit respectively.

According to an example embodiment, the target function corresponds to a sum of the fuel consumptions in the segments.

Furthermore, in an example embodiment, the optimization is based on a metaheuristic method, in particular a simulated annealing method or an evolutionary algorithm, in particular an invasive weed optimization method. Dynamic programming can be used as an additional optimization method.

In an example embodiment, an ECMS method is performed based on the obtained characteristic curve of the setpoint speed in a hybrid drive system in order to ascertain a load distribution between the drive units in accordance with a fuel consumption optimization.

In particular, the target function can depend on the ascertained load distribution, the optimization, and the subsequent ECMS method being performed iteratively.

Furthermore, the motor vehicle can be operated with the aid of an automatic speed controller, based on a specification of the characteristic curve of the setpoint speed.

According to an example embodiment, a device, in particular a vehicle control unit for operating a motor vehicle, is configured to implement one of the above methods. In an example embodiment, a motor vehicle with a hybrid drive system includes the device.

In an example embodiment, the interpolation of the setpoint speeds obtained at the positions of the segment boundaries is performed with the aid of a linear or cubic function.

Specific embodiments are explained in greater detail below on the basis of the attached drawings.

DETAILED DESCRIPTION

Figure 1:
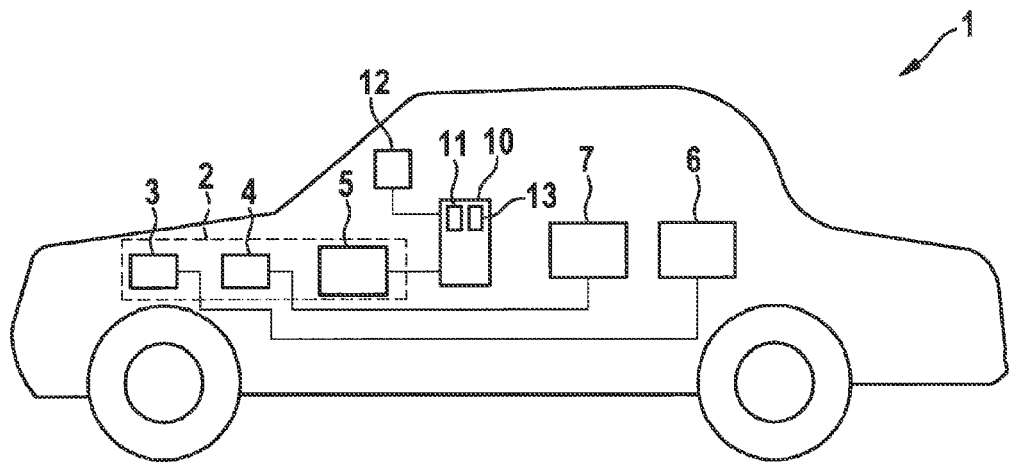
FIG. 1 a schematic representation of a motor vehicle with a driver assistance system, according to an example embodiment of the present invention.

FIG. 1 shows a motor vehicle 1 including a hybrid drive system 2, which includes a first drive unit 3, for example an internal combustion engine, and a second drive unit 4, for example an electric drive. The first drive unit 3 and the second drive unit 4 are able to provide jointly or separately a drive torque, i.e., a drive output, via a drive shaft (not shown) to the drive wheels.

The internal combustion engine as the first drive unit 3 is supplied with fuel as a chemical energy source via a fuel tank 6. Electric drive 4 as the second drive unit 4 is supplied with electrical energy from an electrical energy store 7.

Hybrid drive system 2 also includes a hybrid control unit 5 in order to control first drive unit 3 and second drive unit 4 to provide respective partial drive torques.

A vehicle control unit 10 provides information to hybrid drive unit 5 about the drive torque to be provided as well as information about a load distribution. In a total drive output to be provided or the drive torque to be provided, the load distribution indicates a distribution of the partial drive outputs or partial drive torques to be provided by the different drive units 3, 4. The total drive output to be provided or the drive torque to be provided results as a controlled variable from a speed controller 11, which may be implemented in control unit 10 or separately from it.

Speed controller 11 is used to regulate the speed of the motor vehicle to a setpoint vehicle speed by providing a controlled variable to hybrid control unit 5. In an example embodiment, speed controller 11 is configured to provide to hybrid control unit 5 as a controlled variable a specification about the drive torque to be provided as a function of a system deviation of the vehicle speed with respect to the setpoint vehicle speed.

Vehicle control unit 10 can be connected to a route information system 12, which can be contained in a navigation system. Route information system 12 can be part of a driver assistance system or part of a navigation system. Route information system 12 accesses a map memory that provides information about route segments.

Route information system 12 is able to provide information about the route ahead of the vehicle. Based on navigation data or the like provided, e.g., by the driver, route information system 12 ascertains a route that will be traveled by the motor vehicle with the highest probability (most probable route). Furthermore, the most probable route can be determined in a manner known per se also from historical travel data about previously traveled routes.

The determined most probable route is composed of one or more determined connected route segments. In addition to information about the course of the route segments, route information system 12 is also able to provide to vehicle control unit 10 fuel-consumption-related parameters for each of the route segments concerned as well as speed limits that result for example from legal speed specifications, recommended speeds or curve radii.

Motor vehicle control unit 10 includes an optimization unit 13, which receives from route information system 12 the information about the route segments of the route including the fuel-consumption-related parameters for each of the route segments.

Figure 2:
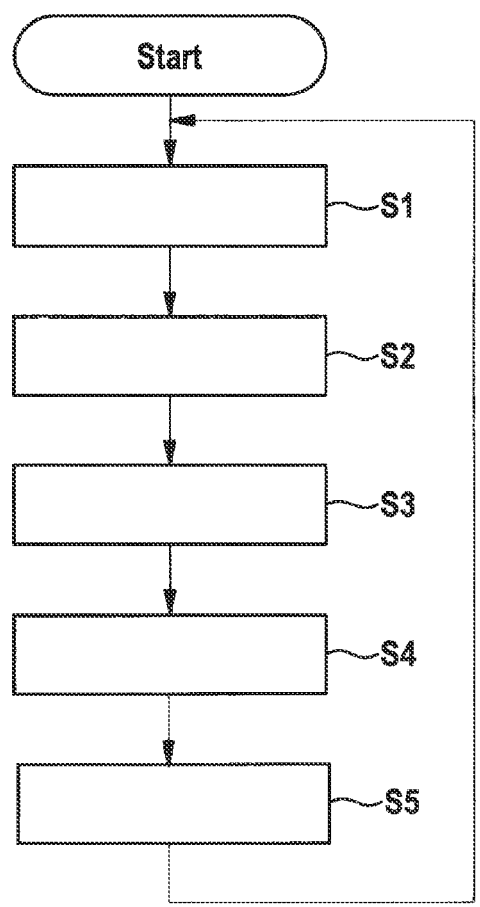
FIG. 2 a flowchart that illustrates a method for ascertaining the specification of a setpoint speed by an optimization method taking into account a route ahead of the vehicle, according to an example embodiment of the present invention.

In connection with the flow chart of FIG. 2, a method is described for optimizing an operation of a motor vehicle with respect to energy consumption, which can be implemented in optimization unit 13.

In step S1, information is provided about adjoining route segments of a route that is most likely to be traveled. The route most likely to be traveled results for example from navigation data input by a driver, from empirical values based on routes already traveled in the past, or the like.

The information about the route segments resulting from the most probable route can include consumption-related route parameters such as for example information about a route incline or decline, about a road surface property or type such as, e.g., expressway, country road, city route, as well as speed limits that result for example from legal speed specifications, suggested speeds or curve radii.

Figure 3:
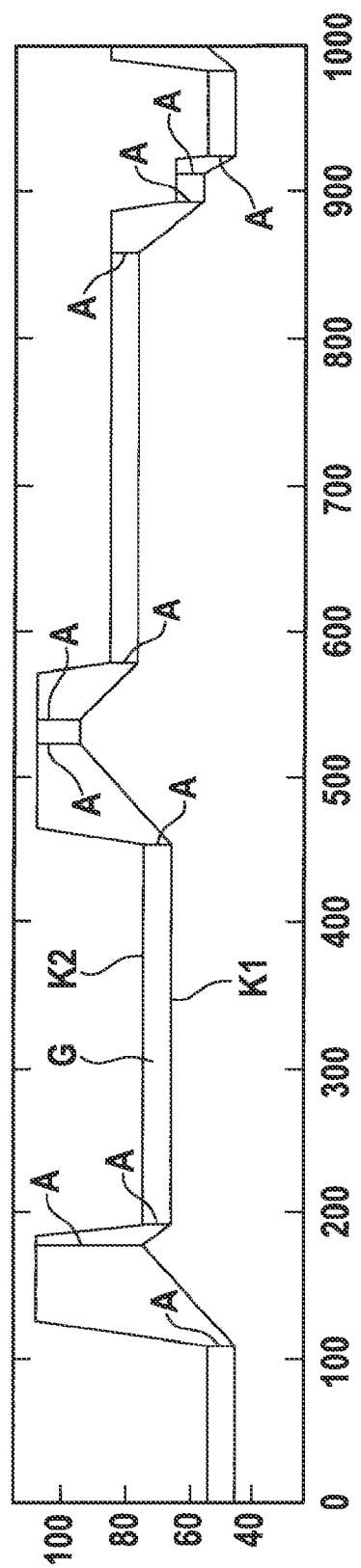
FIG. 3 is a diagram for representing a segment division of a route into route segments by dividing the route at characteristic points of the speed limits specified for the route, according to an example embodiment of the present invention.

In step S2, the route is divided anew into sub-segments. Such a division is possible using different strategies. For example, a division of the route into sub-segments can be performed at characteristic points of the speed band that is specified by the characteristic curves of the speed limits over the route segments of the route. FIG. 3 shows a division of the route at characteristic points of the speed band G specified by speed limits K1, K2. The sub-segments can be defined by those positions of the route at which there is a change of a gradient of the characteristic curves of the upper and the lower speed limits K1, K2. These positions then form the segment boundaries A between respectively two sub-segments.

Alternatively, the division into sub-segments can also be performed with the aid of a calculated energy band based on the speed band. For this purpose, the potential and kinetic energy of the vehicle along the route is calculated based on the specified speed limits so as to result in characteristic curves for energy limits that define the energy band. As in the case of the speed band, the sub-segments can be defined by those positions of the route at which there is a change of a gradient of the characteristic curves of the upper and the lower energy limit K1, K2.

Furthermore, the route can also be divided into sub-segments equidistantly or in another specified manner independently of the route parameters of the route segments of the route.

In step S3, an optimization of the setpoint speed is performed. In contrast to conventional methods, possible speed characteristic curves of the setpoint speed are not considered over the entire route ahead of the vehicle and the fuel consumption optimized accordingly. Rather, setpoint speeds and corresponding fuel consumptions on the segments ahead of the vehicle are only ascertained at the segment boundaries between the sub-segments. By combining setpoint speeds at the segment boundaries it is possible to ascertain a minimum value of the sum of the associated fuel consumptions.

The optimization of the characteristic curve of the setpoint speed over the route ahead of the vehicle is performed with the aid of metaheuristics, it being possible to understand the optimization problem as a combinatorial optimization problem. For this purpose, the system determines a combination of setpoint speeds, at the segment boundaries between the sub-segments, that results in a sum of the fuel consumptions associated with the respective setpoint speeds that is as low as possible. The optimization occurs by taking into account merely the parameters existing at the segment boundaries between the sub-segments as dimensions for the optimization. This substantially reduces the complexity of the optimization problem. Dynamic programming can be used in the known manner as a further optimization method.

If in step S3 a setpoint speed was ascertained for each segment boundary, whereby the sum of the respectively associated fuel consumptions was optimized or minimized, then it is possible in step S4 to ascertain a characteristic curve of the optimized setpoint speed over the entire route as a speed trajectory by interpolation using the ascertained points of the setpoint speed at the segment boundaries.

The characteristic curve of the optimized setpoint speed can be produced for example by linear connection of the setpoint speeds at the segment boundaries or by cubic interpolation between the setpoint speeds at the segment boundaries. Other possibilities of interpolation between the setpoint speeds at the segment boundaries are conceivable as well.

Subsequently, in a hybrid drive system, an optimized load distribution is determined with the aid of the equivalent consumption minimization strategy method (ECMS) as a distribution of the partial drive outputs or partial drive torques to the drive units in accordance with a new optimization of the fuel consumption.

In an example embodiment, the system and method optimize the setpoint speed and the load distribution simultaneously. The optimization is then performed in such a way that the reciprocal action between the setpoint speed and the load distribution is taken into account. The load distribution can be determined for example as an equivalence factor or a torque distribution.

In an example embodiment, in each sub-segment, the weighted sum of the outputs of the drive units is minimized with the aid of the ECMS method. The determination of the load distribution as input parameter has a decisive influence on the fuel consumption and, if applicable, can be adapted predictively as a function of a remaining capacity of an electrical energy store for providing drive energy.

This is followed by an evaluation of the ascertained characteristic curves of the setpoint speed in connection with the ascertained load distribution. Such an evaluation can represent for example information about the entire fuel consumption over the considered route. It is possible, based on the load distributions on the segment boundaries previously ascertained for the sub-segments, to perform a new optimization of the setpoint speeds on the segment boundaries. This makes it possible for the optimization problem to be performed iteratively.

To solve the optimization problem, it is possible to use population-based methods such as evolutionary algorithms, in particular, e.g., invasive weed optimization (IWO). In this method, in addition to adjusting the setpoint speeds at the segment boundaries, an adaptation of the load distribution can also be performed at the individual sub-segment.

As an additional method for the optimization, it is possible to use additional metaheuristic methods such as, e.g., the simulated annealing method. Other metaheuristic methods or local search methods are also conceivable.

What is claimed is:

1. A method for operating a motor vehicle, the method comprising:
    obtaining, by processing circuitry, route segments of a route ahead of the vehicle that is most likely to be traveled;
    obtaining, by the processing circuitry, route parameters associated with the route segments;
    dividing, by the processing circuitry, the route ahead of the vehicle that is most likely to be traveled into sub-segments;
    optimizing, by the processing circuitry, setpoint speeds at the segment boundaries of the sub-segments with respect to a specified target function;
    interpolating, by the processing circuitry, the setpoint speeds obtained at the positions of the segment boundaries in order to obtain a characteristic curve of the setpoint speed; and
    operating the motor vehicle, by the processing circuitry, based on a specification of the characteristic curve of the setpoint speed.

2. The method of claim 1, wherein the obtaining of the route segments includes determining the route most likely to be traveled from navigation data input by a driver or from empirical values based on previously traveled routes.

3. The method of claim 1, wherein the route parameters include consumption-related route parameters.

4. The method of claim 1, wherein the route parameters include information about at least one of a route incline or decline, about a road surface property or type, and about one or more speed limits.

5. The method of claim 1, wherein the sub-segments connect to each other at segment boundaries that are: (a) equidistantly distributed, (b) provided at positions of the route at which a gradient of at least one of a specified upper speed limit changes and a specified lower speed limit changes, and (c) provided at positions of the route at which a gradient of at least one of a upper energy limit changes and a lower energy limit changes, the upper and lower energy limit respectively resulting as sums of potential energy of the motor vehicle at the positions of the route and kinetic energy at a speed that corresponds to the upper and lower speed limit respectively.

6. The method of claim 1, wherein the target function corresponds to a sum of fuel consumptions at the segment boundaries.

7. The method of claim 1, where the optimization is based on a metaheuristic method.

8. The method of claim 7, wherein the metaheuristic method is a simulated annealing method or an evolutionary algorithm.

9. The method of claim 7, wherein the metaheuristic method is an invasive weed optimization method or dynamic programming.

10. The method of claim 1, further comprising performing an equivalent consumption minimization strategy method (ECMS) based on the obtained characteristic curve of the setpoint speed in a hybrid drive system, thereby ascertaining a load distribution between the drive units in accordance with a fuel consumption optimization.

11. The method of claim 10, wherein the optimizing and the ECMS are performed iteratively, and the target function is updated after performance of one of the iterations for the optimization of a following one of the iterations, the update of the target function depending on the latest ascertained load distribution.

12. The method of claim 1, wherein the operating of the motor vehicle includes performing an automatic speed control.

13. The method of claim 1, wherein the interpolation is performed with a linear or cubic function.

14. A device comprising processing circuitry configured to perform a method for operating a motor vehicle, the method comprising:
- obtaining route segments of a route ahead of the vehicle that is most likely to be traveled;
- obtaining route parameters associated with the route segments;
- dividing the route ahead of the vehicle that is most likely to be traveled into sub-segments;
- optimizing setpoint speeds at the segment boundaries of the sub-segments with respect to a specified target function;
- interpolating the setpoint speeds obtained at the positions of the segment boundaries in order to obtain a characteristic curve of the setpoint speed; and
- operating the motor vehicle based on a specification of the characteristic curve of the setpoint speed.

15. A device comprising processing circuitry configured to perform a method for operating a motor vehicle, the method comprising:
- obtaining route segments of a route ahead of the vehicle that is most likely to be traveled;
- obtaining route parameters associated with the route segments;
- dividing the route ahead of the vehicle that is most likely to be traveled into sub-segments;
- optimizing setpoint speeds at the segment boundaries of the sub-segments with respect to a specified target function;
- interpolating the setpoint speeds obtained at the positions of the segment boundaries in order to obtain a characteristic curve of the setpoint speed; and
- operating the motor vehicle based on a specification of the characteristic curve of the setpoint speed.

16. A motor vehicle comprising:
a hybrid drive system; and
processing circuitry configured to perform a method for operating the vehicle, the method comprising:
- obtaining route segments of a route ahead of the vehicle that is most likely to be traveled;
- obtaining route parameters associated with the route segments;
- dividing the route ahead of the vehicle that is most likely to be traveled into sub-segments;
- optimizing setpoint speeds at the segment boundaries of the sub-segments with respect to a specified target function;
- interpolating the setpoint speeds obtained at the positions of the segment boundaries in order to obtain a characteristic curve of the setpoint speed; and
- operating the hybrid drive system based on a specification of the characteristic curve of the setpoint speed.

17. A non-transitory computer-readable medium on which are stored instructions that are executable by a processor and that, when executed by the processor, cause the processor to perform a method for operating a motor vehicle, the method comprising:
- obtaining route segments of a route ahead of the vehicle that is most likely to be traveled;
- obtaining route parameters associated with the route segments;
- dividing the route ahead of the vehicle that is most likely to be traveled into sub-segments;
- optimizing setpoint speeds at the segment boundaries of the sub-segments with respect to a specified target function;
- interpolating the setpoint speeds obtained at the positions of the segment boundaries in order to obtain a characteristic curve of the setpoint speed; and
- operating the motor vehicle based on a specification of the characteristic curve of the setpoint speed.

* * * * *